(No Model.) 2 Sheets—Sheet 1.

W. SCOTT.
VALVE FOR WATER CLOSETS.

No. 255,682. Patented Mar. 28, 1882.

WITNESSES
Wm. S. Belling
F. B. Mitchell

WM. SCOTT,
Inventor:
PER Brown Bros.
ATTORNEYS.

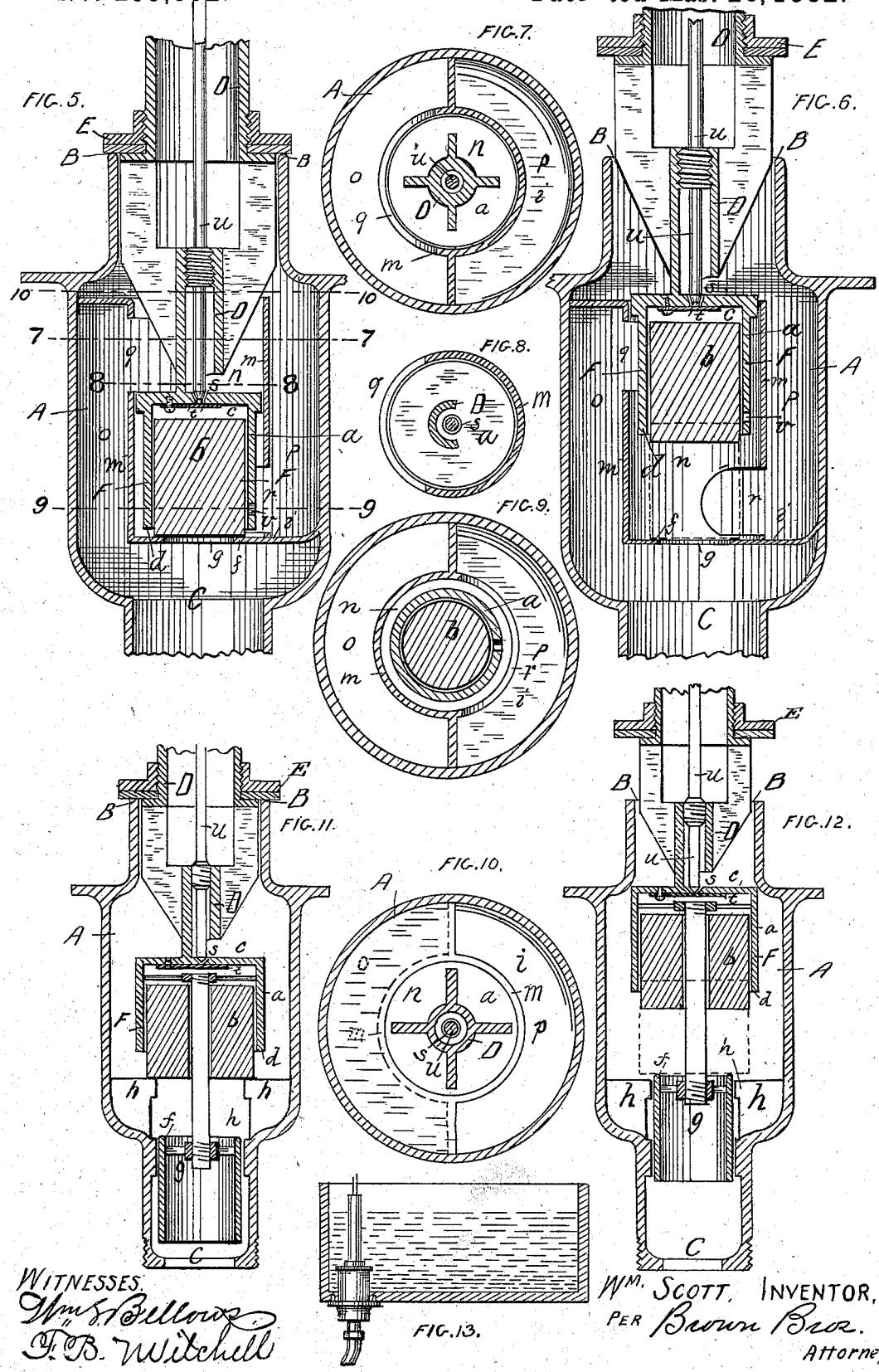

UNITED STATES PATENT OFFICE.

WILLIAM SCOTT, OF MALDEN, MASSACHUSETTS.

VALVE FOR WATER-CLOSETS.

SPECIFICATION forming part of Letters Patent No. 255,682, dated March 28, 1882.

Application filed November 25, 1881. (No model.)

*To all whom it may concern:*

Be it known that I, WILLIAM SCOTT, of Faulkner, Malden, in the county of Middlesex and State of Massachusetts, have invented certain new and useful Improvements in Valves for Water-Closets, of which the following is a full, clear, and exact description.

This invention is designed to regulate the escape of water or other liquid from a tank or other supply under pressure, and it is intended more especially for water-closets.

The object of this invention is to secure under one opening and closing movement of the valve a flow of water through the water-closet bowl, then a stoppage of such flow of water, and after and finally a further and additional flow of water through said bowl.

To that end this invention consists of a valve having two separate and distinct working parts carried by one stem or rod at different points of its length, and of a water-passage having an inlet-port and an outlet-port. The two-part valve, with its stem, is arranged to be moved along the length of the water-passage, and one part of the valve (to be hereinafter called, for convenience of designation, the "inlet-valve") acts as a valve to open and close the inlet-port of the water-passage, and the other part of the valve (to be hereinafter called, for convenience of designation, the "outlet-valve") acts as a valve to open and close the water-passage to the passage of water through and out of it at the outlet-port. The outlet-valve is made in two parts, each constructed and both applied together for one part to move within the other part, and to be capable of such movement to a limited extent or degree in a direction against and directly opposite to the line of movement of the inlet-valve in being opened, and independent of and separate from such line of movement, and all in such a manner and in such relation to said water-apssage and to the seat of the outlet-valve that, during the opening of the inlet-port, the water-passage will be open for water to pass through and out of it, and then afterward closed from the movement of one part of the outlet-valve upon the other part of such valve, and so maintained until, beginning to close the inlet-port, the water passage is again opened for water to pass through and out of it, and is kept so open until the inlet-port is fully closed and again opened.

Figure 1:
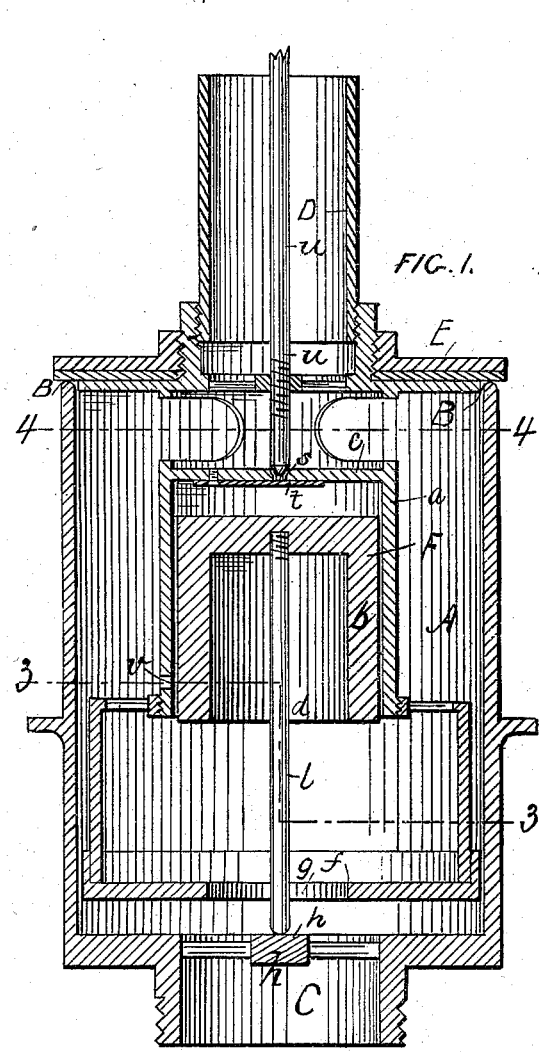
Figure 2:
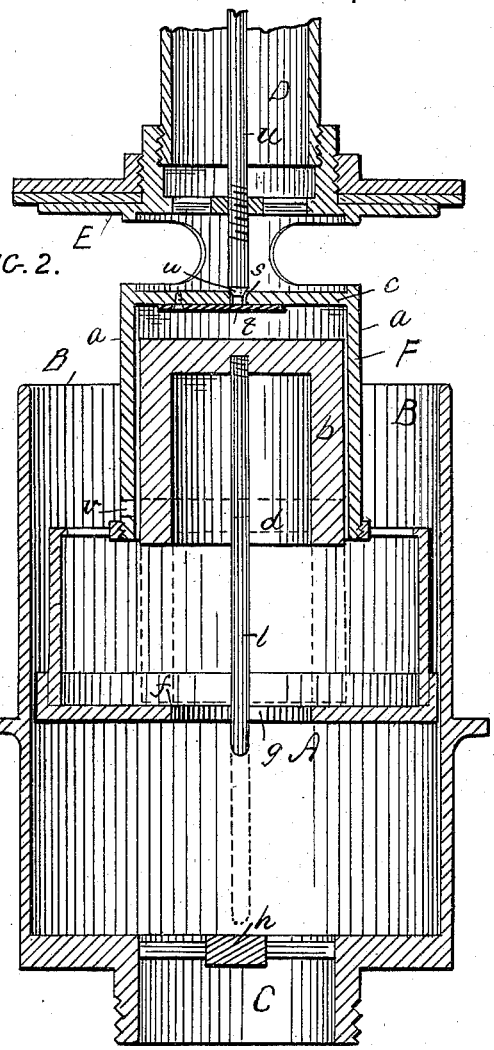
Figure 3:
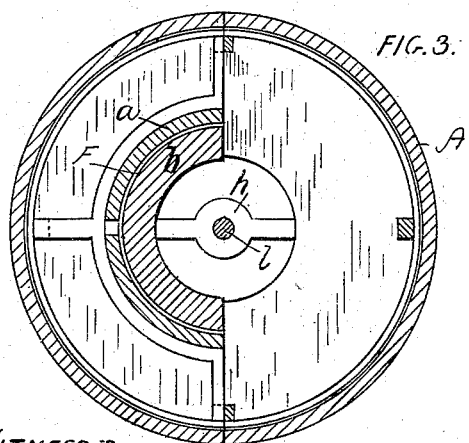
Figure 4:
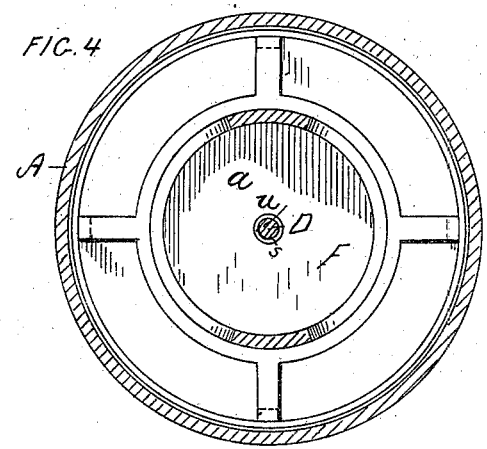

In the accompanying plates of drawings this improved valve is illustrated. Figures 1, 5, and 11 are central vertical sections, and show the inlet-valve closed. Figs. 2, 6, and 12 are central vertical sections, and show the inlet-valve opened. Figs. 3, 4, 7, 8, 9, and 10 are horizontal sections, respectively, on lines 3 3 and 4 4 of Fig. 1 and on lines 7 7, 8 8, 9 9, and 10 10 of Fig. 5.

In the drawings, A represents a vertical water-passage, open at its ends B and C, and arranged at its end B for communication with the water in a tank or other source of supply and for its escape at C. This water-passage A has a valve composed of a vertical stem or rod, D, and two working parts, E and F, located in different horizontal planes. The upper working part, E, is the inlet-valve, and it is constructed to have a seat at and upon the inlet-port B, and when so seated to tightly and securely close such inlet-port against the passage of water from the water-supply through it into the water-passage A, and it is to be arranged in any suitable manner to be moved in a vertical line toward and away from the inlet-port.

The lower working part, F, of the valve is the outlet-valve, and it is in two separate parts, *a* and *b*. One of these parts, *a*, is a vertical cylindrical shell, which is closed upon its upper end, *c*, and open at its lower end, $d$, and makes a continuation of the lower end of the valve-stem. The other part, *b*, is a vertical cylindrical block of a diameter to fit and in such fit to be capable of movement within the cylindrical shell or of the shell upon it, but all in such manner that there will be sufficient hug or friction between the shell and block to secure in the rise or lift of the shell the rise or lift of the block in unison with it, until such rise or lift of the block is counter-affected by gravity or other cause operating upon the block, as will hereinafter more fully appear.

*f* is the seat for the outlet-valve. This seat *f*, as shown in Figs. 1 and 2 and 11 and 12, is a movable one, and it is carried by the valve-stem D, to which it is suitably attached. This movable seat in each instance is a hollow cylinder or tube, open at each end and arranged to move up and down within the water-passage A, and in such movement to be closed to the passage of water between its outer periphery and the inner periphery or side of the water-passage. The seat $f$ has an opening, $g$, through it, which is in line with the block $b$ of the outlet-valve F, and is of a suitable size to be closed by the lower end of such block when it is at rest thereon.

$h$ is a rest for the block $b$ of the outlet-valve. This rest is distinct from the rest of such block upon the movable valve-seat, and it is open to the passage of water through it at all times. In Figs. 11 and 12 the rest $h$ is shown as arranged for the block $b$ to rest directly upon it, and in Figs. 1 and 2 to rest through a downward stem or extension, $l$, of the block, which stem passes through the center of the opening $g$ in seat $f$ to outlet-valve. The seat $f$ in each instance is located in position to support block $b$ in place and against dropping when in the closing of the inlet-valve the movable valve-seat $f$ passes away from its position of support for the block, as will hereinafter more fully appear.

The seat for outlet-valve (shown in Figs. 5 and 6) is a stationary one, and it is a part of a horizontal partition, $i$, which is secured in place in the water-passage A in any suitable manner, and it has an opening, $g$, similar to that of the movable seat, and which is closed by the rest of the block $b$ of outlet-valve upon it. This stationary seat is at the lower end of a stationary vertical tube, $m$, dividing the water-passage into three distinct water-passages, $n$, $o$, and $p$, arranged alongside of each other. The passage $n$ is through and within and the passages $o$ and $p$ are upon the outside and at opposite sides of the tubular partition $m$. These several passages communicate with the inlet-port—the central passage, $n$, by its upper open end, the side passage $o$ by a side port $q$ in the upper part of tubular partition $m$, and the side passage $p$ by its upper open end, and this latter side passage has communication with the central passage, $n$, through a side port $r$ in lower part of tubular partition.

The inner wall of the tubular partition $m$ guides the shell $a$ to outlet-valve F in the upward and downward movement of such shell from the corresponding movement of the inlet-valve E, and it is to be fitted or packed in any suitable manner to prevent the passage of water between it and the guide-wall of the tubular partition.

The side ports, $q$ $r$, of the tubular partition $m$ are situated in such relative positions that the upper port, $q$, is open and the lower port, $r$, is closed when the shell $a$ to outlet-valve F is in its lowermost position; or, in other words, the inlet-valve E is closed and the lower port, $r$, is open when the shell to outlet-valve is in its uppermost position, or, in other words, when the inlet-valve is fully opened.

The valve-stem D consists of a tube opening at its lower end into the water-passage A, and this tube, if the valve described is used in a water-tank, is to be the overflow-pipe to such tank.

The upper closed end, $c$, of the shell $a$ to outlet-valve F has an aperture, $s$, of conical shape through it, and this aperture is provided with a flap-valve, $t$, that is arranged to close such aperture against the passage of water through it from the inside of the shell and to open to the passage of water through the aperture from the outside to the inside of the shell.

$u$ is a vertical screw stem or plug of the valve-stem D. One end of this screw stem or plug $u$ enters the aperture $s$ of outlet-valve F, and such end is shaped to close, to a greater or lesser degree, said aperture, according as it may be inserted therein, by adjusting it upon the valve-stem D. The screw-stem $u$ is to be projected at the upper open end of the tubular valve-stem D, and it is to be connected in any suitable manner to the mechanism by which the valve herein described is to be raised to open it to the passage of water from the water-tank and is to be lowered to close it to such passage of water—as, for instance, the ordinary mechanism applied to the seats of water-closets to secure a flow of water from the water-tank when the seat is in use. In this valve the inlet-valve E opens in its upward movement and closes in its downward movement. The upward movement of the inlet-valve E carries with it both parts of the outlet-valve F, and if the seat $f$ for outlet-valve be secured to the valve-stem, also such seat, and thus, until the inner part or block, $b$, of the outlet-valve drops or falls upon the seat $f$, the water-passage A is open for the flow of water through and out of it at the outlet-port $c$. After this drop of the inner block, $b$, to the outlet-valve F, and when such block has seated itself upon its seat $f$, the flow of water through and out of the water-passage A is stopped and so continues as long as the inlet-port B remains open, but again takes place the moment the outlet-valve lowers from the closing of the inlet-valve, because in such movement either the seat $f$ passes away from the block and is thus opened (see Figs. 1, 2, 11, and 12) or the shell passes by the side port $q$, which is thus opened (see Figs. 5 and 6) for the passage of water out of the water-passage A at its outlet C.

In the opening of the outlet-port, as above described, the shell $a$ of the outlet-valve passes down over the outside of the block $b$, making the inner part of such valve, and this block, if its seat $f$ be movable, is then supported in position or against falling as the seat leaves it by its rest upon the rest $h$ therefor, and if such seat be stationary, then by such seat itself.

The fall of the block $b$, as above described, to its seat is assisted by the entrance of water at the aperture $s$ of the shell above the block; but it might be left to the action of its own gravity. It is preferable, however, to admit water as stated, as it insures a positive fall of the block, as described.

The entrance of water to the inside of the shell is regulated by means of the screw-plug $u$ to the aperture $s$, as is obvious, and as a consequence the drop of the block to close the outlet-port can be adjusted as to its quickness of movement, as may be desired.

The screw-plug $u$ for the valve-aperture $s$ may be adapted to be projected through said aperture against the flap-valve $t$, so as to hold said flap-valve open without fully closing the aperture, and thus the shell may be open at all times to the flow of water into and out of it.

In the closing of the inlet-valve as above described, if the valve as constructed be left to operate independently of any other mechanism its closing movement obviously is against the water which may be in the shell part of the outlet-valve, and as a consequence the rapidity with which the inlet-valve closes depends upon the freedom with which the water can escape from the shell. With the flap-valve in operation the escape of the water from the shell can only occur between the sides of the shell and its inner block.

In the operation of the valve as above the opening of the inlet-valve secures a flow of water in, through, and out of the water-passage, and this flow of water, when the block drops to its seat, is stopped, and so continues as long as the inlet-valve remains open, when, as the inlet-valve is closed, the water-passage is again opened to the flow of water through and out of it, which continues until the inlet-valve is finally closed. By this means, under one operation of opening and closing the inlet-valve a preliminary flow and an after flow of the water through and out of the water-passage are secured, the advantages of which in connection with water-closets are obvious. As the water-passage at its outlet is open when the inlet is closed, and the valve-rod is a tube opened to the water-passage and arranged as an overflow-pipe for the water-tank, obviously the overflow, if any, of the water in the tank can pass off through the bowl.

V is an aperture at the lower end of the shell $a$ of the outlet-valve F. This aperture is situated to allow water to enter the shell when the block $b$ of the outlet-valve is at rest upon its seat. The closing of the outlet-valve on the opening of the inlet-valve is regulated by the quickness of the seating of the block of the outlet-valve, and, again, the closing of the inlet-valve, if no outside means or working force be used, is regulated as to quickness by the expulsion of water from the chamber of the shell $a$ to the outlet-valve, and, as appears from the description herein given, these several operations are capable of being regulated as may be desired.

In Fig. 13 is shown a water-tank in vertical section having this improved valve (shown in side elevation) arranged in connection therewith, as herein described.

Having thus described my invention, what I claim, and desire to secure by Letters Patent, is—

1. In a valve for water-closets, &c., the water-passage A, having an inlet-port, B, and an outlet-port, C, valves E and F, attached to a common stem, and the one, F, made in two parts arranged to move upon each other, and separate seats for the two valves, all constructed, arranged, and combined together to secure in one operation of the valve the simultaneous opening of the inlet and outlet ports, a then separate and independent closing of the outlet-port, and an after opening of the outlet-port as and while the inlet-port is closing, substantially as described, for the purposes specified.

2. In a valve for water-closets, &c., the water-passage A, having an inlet-port, B, and an outlet-port, C, valves E and F, attached to a common stem, and the one, F, made in two parts arranged to move upon each other and having a passage in outer part, $a$, opening to the inner part, $b$, and separate seats for the two valves, all constructed, arranged, and combined together to secure in one operation of the valve the simultaneous opening of the inlet and outlet ports, a then separate and independent closing of the outlet-port, and an after opening of the outlet-port as and while the inlet-port is closing, substantially as described, for the purposes specified.

3. In a valve for water-closets, &c., the water-passage A, having an inlet-port, B, and an outlet-port, C, valves E and F, attached to a common stem, and the one, F, made in two parts arranged to move upon each other, separate seats for the two valves, and an open passage, D, through the valve E, all constructed, arranged, and combined together to secure in one operation of the valve the simultaneous opening of the inlet and outlet ports, a then separate and independent closing of the outlet-port, and an after opening of the outlet-port as and while the inlet-port is closing, substantially as described, for the purposes specified.

In testimony whereof I have hereunto set my hand in the presence of two subscribing witnesses.

WILLIAM SCOTT.

Witnesses:
EDWIN W. BROWN,
WM. S. BELLOWS.